United States Patent
Dosho et al.

[19]

[11] Patent Number: 6,121,826
[45] Date of Patent: Sep. 19, 2000

[54] COMB FILTER AND METHOD FOR CONTROLLING THE SAME

[75] Inventors: Shiro Dosho; Naoshi Yanagisawa, both of Osaka; Masayuki Ozasa, Kyoto; Hidehiko Kurimoto, Osaka, all of Japan; Tatsuo Okamoto, Cupertino, Calif.

[73] Assignee: Matsushita Electric Industrial Co., Ltd., Osaka, Japan

[21] Appl. No.: 09/210,780

[22] Filed: Dec. 15, 1998

[30] Foreign Application Priority Data

Dec. 19, 1997 [JP] Japan ................................ 9-350484

[51] Int. Cl.[7] .................................................. H03K 5/00
[52] U.S. Cl. ......................... 327/553; 327/552; 327/332; 348/665
[58] Field of Search ...................... 327/552, 553, 327/261, 331, 332; 348/665, 667, 669, 670

[56] References Cited

U.S. PATENT DOCUMENTS 5,523,798  6/1996  Hagino et al. ......................... 348/665

FOREIGN PATENT DOCUMENTS

| 0 511 682 A2 | 11/1992 | European Pat. Off. . |
| 0 617 564 A2 | 9/1994 | European Pat. Off. . |
| 61-144997 | 7/1986 | Japan . |
| 62-06789 | 3/1987 | Japan . |
| 6206789 | 3/1987 | Japan . |
| 6264085 | 4/1989 | Japan . |
| 4-114591 | 4/1992 | Japan . |
| 4-365291 | 12/1992 | Japan . |
| 08205184 | 8/1996 | Japan . |
| 8-205184 | 8/1996 | Japan . |

OTHER PUBLICATIONS

Kazuyuki Matsui et al., "CMOS Video Filters Using Switched Capacitor 14–MHz Circuits", IEEE Journal of Solid–State Circuits, vol. SC–20, No. 6, Dec. 1985, pp. 1096–1101.

Patent Abstracts of Japan, vol. 14, No. 151, (E–906), Mar. 22, 1990 & JP 02 010993 A, Published. Jan. 16, 1990 (Hitachi).

*Primary Examiner*—Dinh T. Le
*Attorney, Agent, or Firm*—Eric J. Robinson; Nixon Peabody LLP

[57] ABSTRACT

A comb filter easily implementable as a monolithic LSI without using a large-capacitance capacitor is provided. A comb-like frequency characteristic is realized by two delay circuits for delaying a signal for mutually different amounts of time and an operation circuit for deriving a sum or difference of the outputs thereof. An input select switch selectively outputs, instead of an image signal, a test signal, which is a DC signal having a predetermined amplitude, during a blanking interval of the image signal. A detector controls the gain of a variable-gain amplifier, provided for the output of either one of the delay circuits, in accordance with a difference between the output signal of the comb filter in response to the test signal and a predetermined reference signal. That is to say, the gain of the comb filter is controlled by using a stable test signal as a control signal, instead of a burst signal contained in an unstable image signal. Accordingly, a large-capacitance capacitor, which has been required for stabilizing the control signal, is no longer necessary.

11 Claims, 15 Drawing Sheets

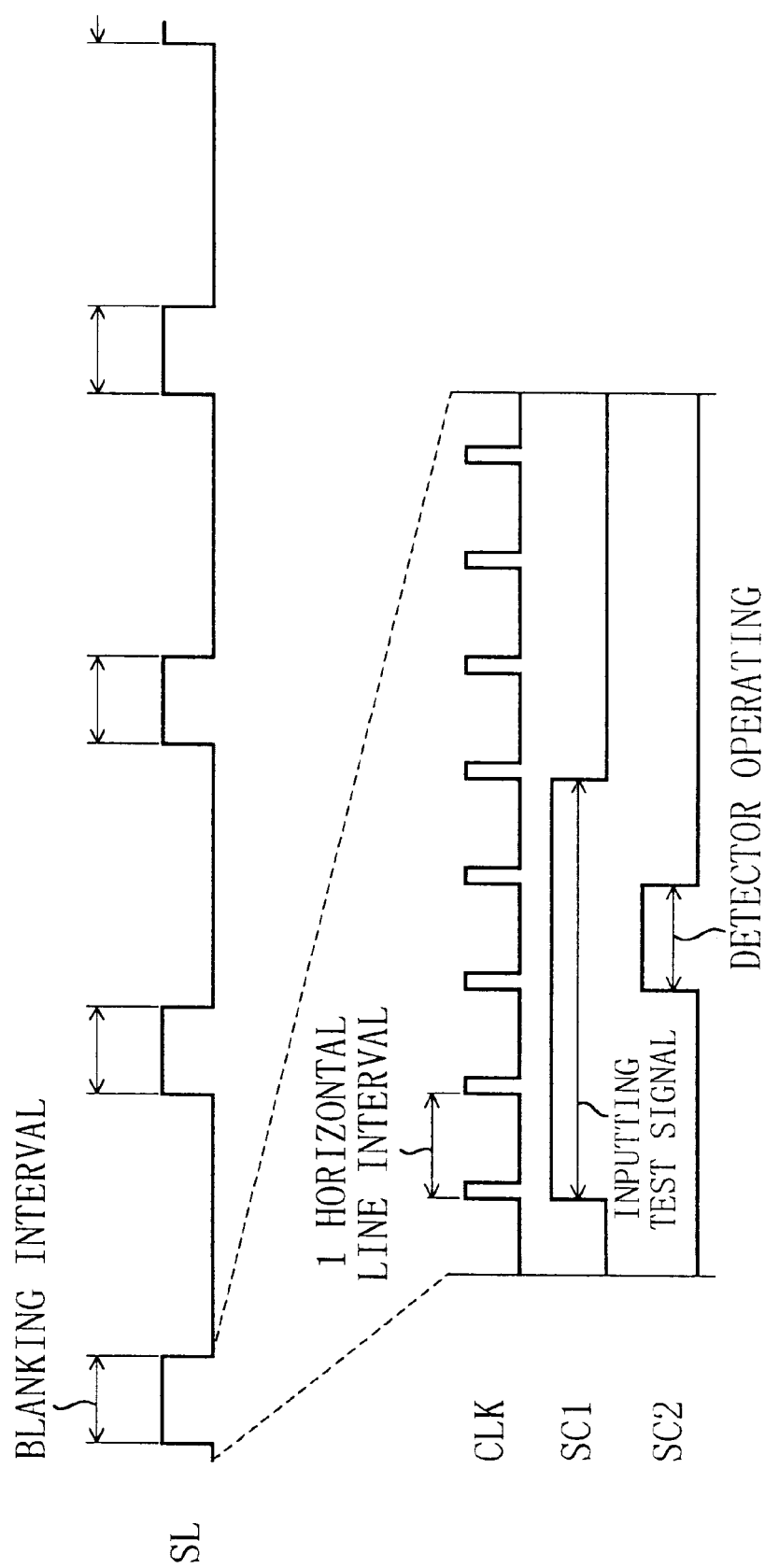

COMB FILTER AND METHOD FOR CONTROLLING THE SAME

BACKGROUND OF THE INVENTION

The present invention relates to a comb filter, the frequency characteristics of which have the appearance of a comb and which is used for various types of processing such as color separation of an image signal.

FIG. 14 is a block diagram illustrating an exemplary configuration of a conventional comb filter. In the comb filter shown in FIG. 14, an input image signal SI is supplied to a 1H delay line 101 for delaying the signal by 1H (i.e., one horizontal retrace interval) and to an adder 102. The output of the 1H delay line 101 is amplified by an AGC (automatic gain control) amplifier 103 and then added to the input image signal SI by the adder 102. The sum is output as an output signal SO having comb-like frequency characteristics. The gain of the AGC amplifier 103 is controlled by a gain controller 104 such that the variation in the gain of the 1H delay line 101 is eliminated (see, for example, Japanese Laid-Open Publication No. 61-144997).

Comb filters having similar configurations are also disclosed in Japanese Laid-Open Publications Nos. 4-114591 and 4-365291.

In a conventional comb filter, a burst signal is used as a control signal for controlling the gain of a delay circuit.

FIG. 15 is a diagram illustrating a burst signal. A "burst signal" is a reference signal to be inserted one by one into an image signal such a TV signal or a video signal every horizontal retrace interval. The burst signal has a predetermined frequency and the amplitude thereof is constant. In the comb filter shown in FIG. 14, while a burst interval detector 105 is detecting the input of the burst signal, the gain controller 104 is operating to control the gain of the AGC amplifier 103.

However, the signal level of a burst signal is sometimes varied or dropped. For example, in a TV signal, if the output transmitted varies, then the signal level of the burst signal also varies. During the reproduction of a video signal, the burst signal may be sometimes dropped depending on the recording states of a video tape. In actuality, if a dropout superimposes with a burst signal when a signal is reproduced by a video tape recorder, for example, the frequency characteristics of a comb filter cannot be kept normal.

Thus, a conventional comb filter is provided with a capacitor for storing burst signals such that the frequency characteristics thereof are not adversely affected by the variation or dropping of the burst signals. A considerable number of burst signals (on the order of 100 to 200) are stored in the capacitor and used for controlling the gain. Such a capacitor has large capacitance (ordinarily 1 $\mu$F or more) and cannot be built in an LSI constituting a comb filter. Thus, such a capacitor is provided as an external component for the LSI.

The conventional comb filter uses a CCD, enabling efficient transfer of charges, as a delay device. However, since a CCD is fabricated through a different process from that applied to the other circuit components, the CCD cannot be incorporated into the LSI constituting a comb filter, either. Accordingly, a CCD also needs to be provided as an external component for the LSI.

As can be understood, since a large-capacitance capacitor and a CCD should be provided as external components for an LSI in accordance with the prior art, it is very difficult to implement a conventional comb filter as a monolithic LSI.

SUMMARY OF THE INVENTION

The object of the present invention is to provide a comb filter, which is easily implementable as a monolithic LSI without using any large-capacitance capacitor.

The present inventors carried out intensive research and development to conclude that it is realizable to apply an analog memory as a delay device to a comb filter. Accordingly, a CCD is no longer necessary for a comb filter and only a large-capacitance capacitor should be provided as an external component for an LSI. Thus, if the large-capacitance capacitor could also be eliminated, then a comb filter would be easily implementable as a monolithic LSI. In other words, the problem to be solved by this invention, i.e., eliminating a large-capacitance capacitor from a comb filter, suddenly became an issue, because an analog memory was found applicable as a delay device as a result of the research and development carried out by the present inventors.

Specifically, a comb filter according to this invention includes: an input select switch for selectively outputting either an externally supplied image signal or a test signal independent of the image signal; first and second delay circuits for delaying the output signal of the input select switch for mutually different amounts of time; a variable-gain amplifier for amplifying the output of the first or second delay circuit, the gain of the variable-gain amplifier being variable; an operation circuit for deriving a sum or difference of the outputs of the variable-gain amplifier and the first or second delay circuit, for which the variable-gain amplifier is not provided; a detector for detecting a difference between the output of the operation circuit and a predetermined reference signal and for controlling the gain of the variable-gain amplifier in accordance with the difference; and control means for controlling the operations of the input select switch and the detector. The control means makes the detector operate for a time interval during which the control means controls the input select switch to selectively output the test signal.

According to the present invention, the detector detects a difference between the output of the operation circuit in response to the test signal selectively output by the input select switch and a predetermined reference signal, thereby controlling the gain of the variable-gain amplifier in accordance with the difference. That is to say, the gain of the comb filter can be controlled by using the test signal, independent of the image signal, as a control signal. Accordingly, since the signal level of the control signal is neither varied nor dropped, the characteristics of the filter can always be stable. In addition, a large-capacitance capacitor, which has conventionally been provided for storing control signals and thereby stabilizing the gain, is no longer necessary, and therefore the number of external components can be reduced when the comb filter is implemented as an LSI. Since no CCD needs to be provided as a delay device as described above, the comb filter can be implemented as a monolithic LSI requiring no external components.

A method for controlling a comb filter according to the present invention is applicable to a comb filter including first and second delay circuits for delaying respective input signals for mutually different amounts of time and for performing processing such as color separation on an image signal. The method includes the steps of: inputting a test signal into the comb filter independent of the image signal; comparing the output of the comb filter in response to the input of the test signal to a predetermined reference signal; and controlling a gain to be amplified for the output of at least one of the first and second delay circuits based on a difference obtained by the step of comparing.

Another comb filter according to the present invention includes: a first delay circuit including an analog FIFO memory and delaying an input signal for a predetermined time; and a second delay circuit delaying an input signal for a different amount of time than the predetermined time. The analog FIFO memory includes: an analog memory having a plurality of storage devices, each storing a signal; a sample and hold circuit for sampling and holding an input signal; a write circuit for writing an output signal of the sample and hold circuit into the analog memory; and a read circuit for reading out the signal from the analog memory. The second delay circuit receives the output of the write circuit as an input.

According to the present invention, the second delay circuit receives, as an input, the output of the write circuit of the analog FIFO memory in the first delay circuit, not the input signal of the first delay circuit. Accordingly, the variation in gain when data is written into the analog memory of the first delay circuit is reflected in the output of the second delay circuit so as to be canceled. Consequently, the characteristics of the filter can be stabilized.

BRIEF DESCRIPTION OF THE DRAWINGS

FIG. 3 is a chart illustrating an exemplary method for controlling an input select switch and the detector in the comb filter shown in FIG. 1.

DESCRIPTION OF THE PREFERRED EMBODIMENTS

EMBODIMENT 1

Figure 1:
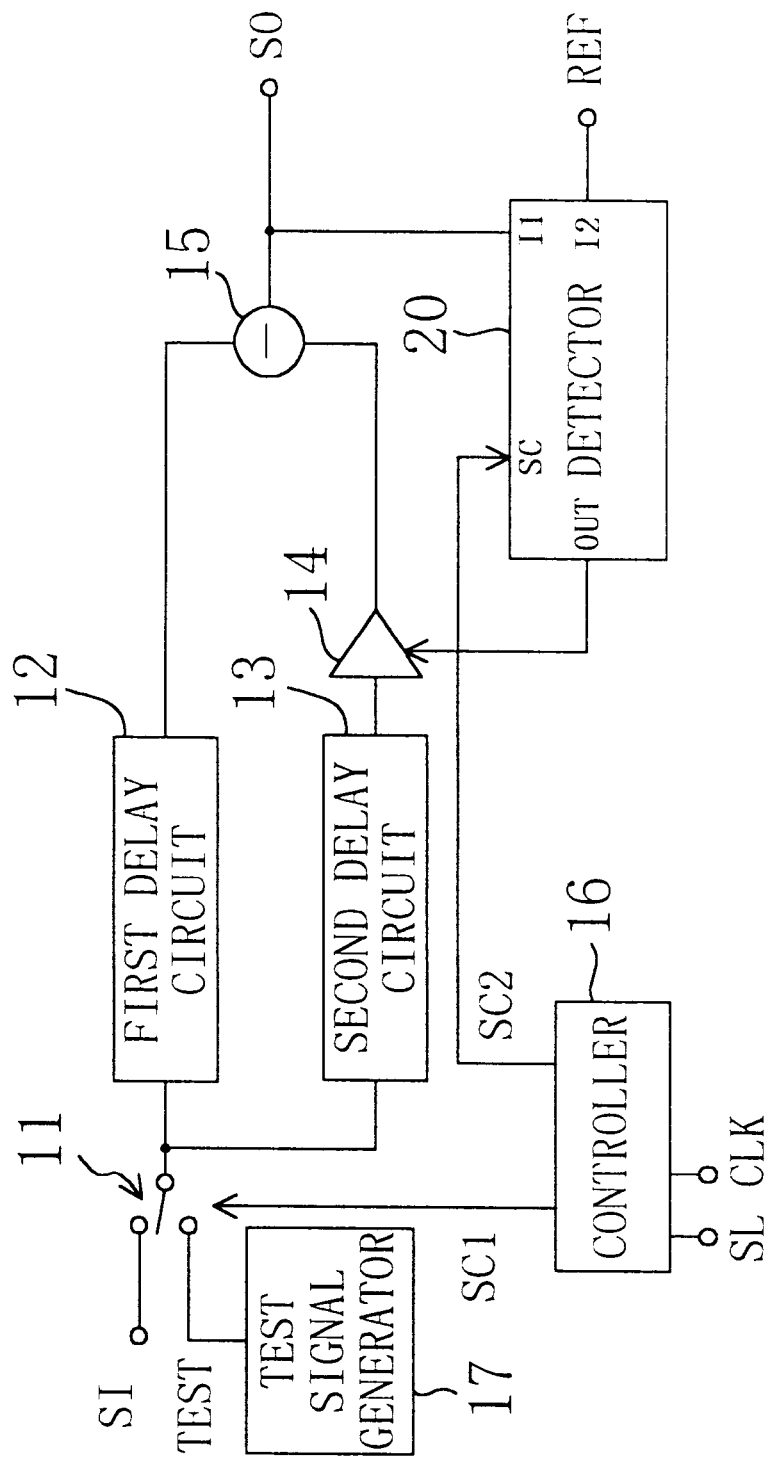
FIG. 1 is a diagram illustrating the configuration of a comb filter according to the first embodiment of the present invention.

FIG. 1 is a diagram illustrating the configuration of a comb filter according to the first embodiment of the present invention. As shown in FIG. 1, the comb filter includes: an input select switch 11; first and second delay circuits 12, 13; a variable-gain amplifier 14; a subtracter 15; a detector 20; a controller 16; and a test signal generator 17. The input select switch 11 selectively outputs either an externally supplied image signal SI or a test signal TEST independent of the image signal SI. The first and second delay circuits 12, 13 delay the output of the input select switch 11 for mutually different amounts of time. The variable-gain amplifier 14 amplifies the output of the second delay circuit 13 and has a variable gain. The subtracter 15 is an operation circuit for deriving a difference between the outputs of the variable-gain amplifier 14 and the output of the first delay circuit 12. The detector 20 detects a difference between the output of the subtracter 15 (i.e., an output signal SO) and a reference signal REF and controls the gain of the variable-gain amplifier 14 in accordance with the difference. The controller 16 receives an input select signal SL and a clock signal CLK, and supplies first and second control signals SC1 and SC2 for controlling the operations of the input select switch 11 and the detector 20, respectively. The test signal generator 17 generates the test signal TEST.

In the comb filter shown in FIG. 1, the input image signal SI is input through the input select switch 11 into the first and second delay circuits 12, 13, passed through these circuits 12, 13, and then subtracted by the subtracter 15 to be output as the output signal SO. The first delay circuit 12 is ordinarily constructed by using a CCD or an analog FIFO memory. The second delay circuit 13 is constituted by a simple slewing circuit or a sample and hold circuit.

The frequency characteristic F of a comb filter is generally represented by the following Equation (1):

$$F=(1-Z^{-1}) \qquad (1)$$

where Z is a Z variable having a value corresponding to the difference between the delays of the first and second delay circuits 12, 13. In order to realize the frequency characteristic F represented by Equation (1), the difference in delay between the signals transmitted through respective signal paths in the first and second delay circuits 12, 13 should be precisely controlled at a predetermined value and the gains of these signals should be matched with each other.

The difference in delay between the signals can be easily and accurately controlled at a desired value by using a sampling circuit such as a switched capacitor. However, it is difficult to match the gains of these signals with each other. One reason is that the first and second delay circuits 12, 13 have mutually different configurations. Thus, the output signals of the first and second delay circuits 12, 13 usually have mutually different gains (i.e., the gains are variable between these delay circuits) although these delay circuits 12, 13 receive the same input signal.

Thus, a circuit for controlling a gain is provided for the output of the first or second delay circuit 12 or 13, and the gains of the output signals of the first and second delay circuits 12, 13 are matched with each other in accordance with a feedback technique. In FIG. 1, the variable-gain amplifier 14 is provided for the output of the second delay circuit 13. The difference between the output signal SO and the reference signal REF is amplified and integrated by the detector 20 and then fed back to the variable-gain amplifier 14, thereby constituting a "negative feedback loop".

Figure 2:
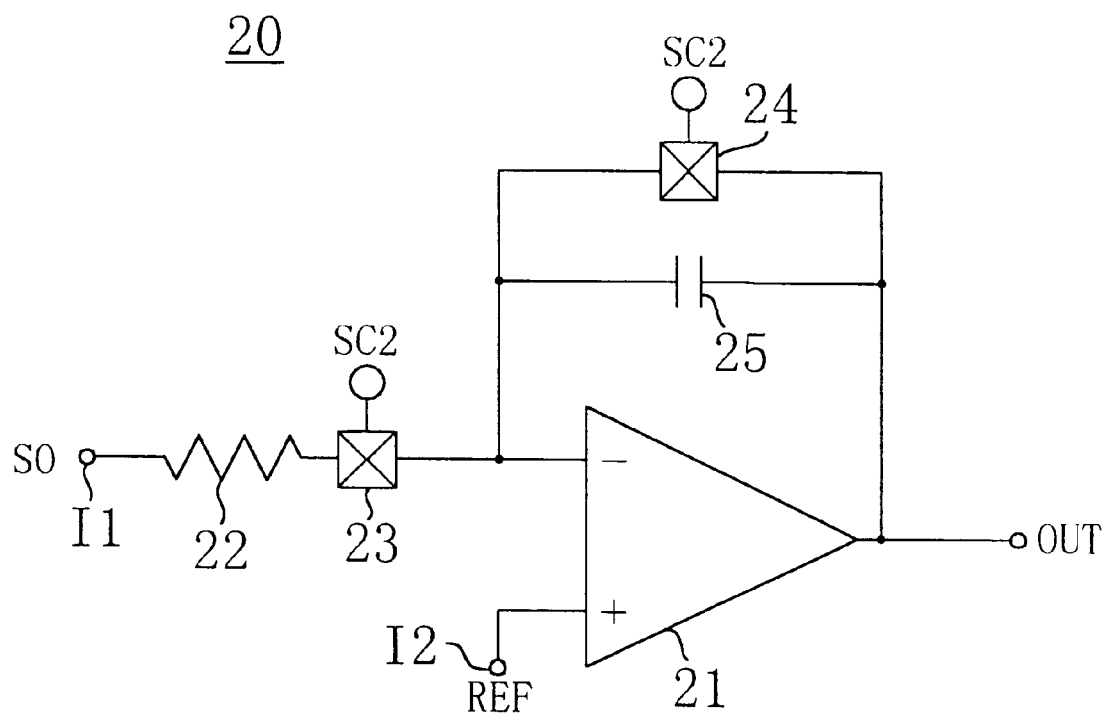
FIG. 2 is a diagram illustrating the configuration of a detector in the comb filter shown in FIG. 1.

FIG. 2 is a diagram illustrating an exemplary circuit configuration of the detector 20. As shown in FIG. 2, the detector 20 includes: an operational amplifier 21; a resistor 22; a first switch 23; a second switch 24; and a capacitor 25.

The operational amplifier 21 receives a reference signal REF at the noninverting input thereof, and the output thereof is the output OUT of the detector 20. One terminal of the resistor 22 is connected to the input I1 of the detector 20. The first switch 23 is provided between the other terminal of the resistor 22 and the inverting input of the operational amplifier 21. The second switch 24 is provided between the inverting input and the output of the operational amplifier 21. And the capacitor 25 is also provided between the inverting input and the output of the operational amplifier 21 in parallel to the second switch 24.

While the first switch 23 is ON, the detector 20 functions as an integrator having a time constant obtained by the resistance of the resistor 22 and the capacitance of the capacitor 25. On the other hand, while the first switch 23 is OFF, the output of the operational amplifier 21 is kept at a constant value. Furthermore, when the second switch 24 is turned ON, the charges stored in the capacitor 25 totally disappear and the detector 20 is reset. Thus, the second switch 24 is used for initializing the circuit. By utilizing the circuit configuration shown in FIG. 2, the difference between the output signal SO and the reference signal REF can be amplified, integrated and then output.

In this embodiment, the gain of the output of a delay circuit is controlled by using the test signal TEST, independent of the image signal SI, as a control signal. A DC signal having a predetermined voltage is used as the test signal TEST. In such a case, a reference voltage source of an LSI including this comb filter may be used as the test signal generator 17. Also, an analog ground level (i.e., a zero signal) is supplied as the reference signal REF. This is because when a DC signal (having a frequency of zero) is supplied as a control signal, the amplitude of the output signal SO is zero in view of the frequency characteristic represented by Equation (1).

The test signal TEST is generated by the test signal generator 17 independent of the image signal SI, and therefore is neither varied nor dropped. Accordingly, the gains can always be controlled stably. A conventional comb filter requires a capacitor having a capacitance of 1 $\mu$F or more. By contrast, in the detector 20 of this embodiment, the capacitance of the capacitor 25 needs to be only about 10 pF. Thus, there is no need to provide a large-capacitance capacitor.

FIG. 3 is a chart illustrating how the controller 16 controls the input select switch 11 and the detector 20. In the example shown in FIG. 3, an NTSC signal is supplied as the image signal SI and the gains are controlled during the blanking interval of the image signal. A "blanking interval" is a period during which no image signal is displayed on the screen and the operation of the comb filter is not particularly required. In this case, a detection signal for a vertical blanking interval of the NTSC signal is used as the input select signal SL and a horizontal synchronous signal for an image signal in synchronism with the NTSC signal is used as the clock signal CLK.

The controller 16 latches on the leading edge of the input select signal SL in response to the clock signal CLK. From this point in time on, the controller 16 controls the input select switch 11 to selectively output the test signal TEST for four cycles of the clock signal CLK by supplying the first control signal SC1 to the switch 11. From a point in time two cycles of the clock signal CLK has passed since the selective output of the test signal TEST from the input select switch 11 was initiated, the controller 16 makes the detector 20 operate for one cycle of the clock signal CLK by supplying the second control signal SC2 to the detector 20.

The time corresponding to two cycles of the clock signal CLK (horizontal synchronous signal) is sufficiently longer than the delay time of the first or second delay circuit 12, 13. Thus, when the detector 20 starts to operate, the delayed test signals TEST have already been output from the first and second delay circuits 12, 13. Accordingly, the above feedback control can be carried out by the detector 20.

Also, at a point in time one cycle of the clock signal CLK has passed since the detector 20 stopped operating, the controller 16 makes the input select switch 11 terminate the selective output of the test signal TEST. In this embodiment, the input select switch 11 is turned OFF intentionally at a different time than the time when the detector 20 is turned OFF. This time lag is provided such that the detector 20 does not sense unnecessary noise when the detector 20 stops operating.

Figure 4A:
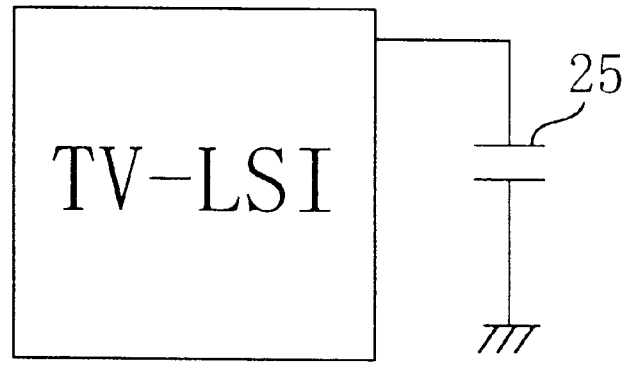
FIG. 4(a) is a diagram schematically illustrating the configuration of a conventional LSI for TV.
Figure 4B:
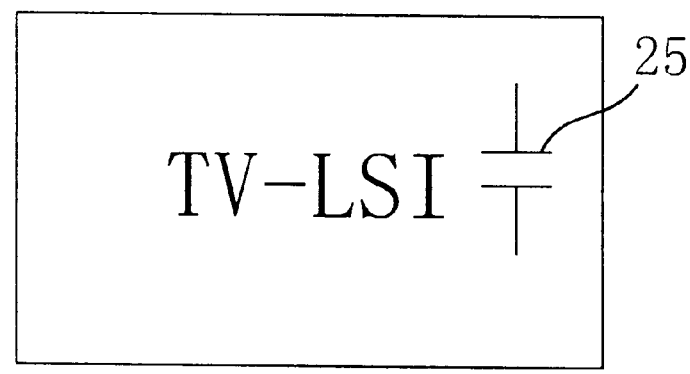
FIG. 4(b) is a diagram schematically illustrating the configuration of an LSI for TV using the comb filter shown in FIG. 1.

FIGS. 4(a) and 4(b) schematically illustrate the effect of the present invention. As shown in FIG. 4(a), a conventional LSI for TV requires a large-capacitance capacitor as an external component. By contrast, in this embodiment, the capacitance of the capacitor 25 of the detector 20 may be small and contained in an LSI for TV as shown in FIG. 4(b). Accordingly, there is no need to provide any external capacitor.

In this embodiment, the image signal SI is supposed to be an NTSC signal. Alternatively, the image signal SI may be a TV signal in compliance with the PAL standard or any image signal other than a TV signal, e.g., a video signal.

Any signal may be used as the test signal TEST so long as the signal has a predetermined amplitude and a constant frequency. For example, a signal having the same amplitude and frequency as those of a burst signal may be used as the test signal TEST. Anyway, an appropriate reference signal REF suitable for the test signal TEST must be selected to realize desired comb-like characteristics.

MODIFIED EMBODIMENTS OF EMBODIMENT 1

Figure 5:
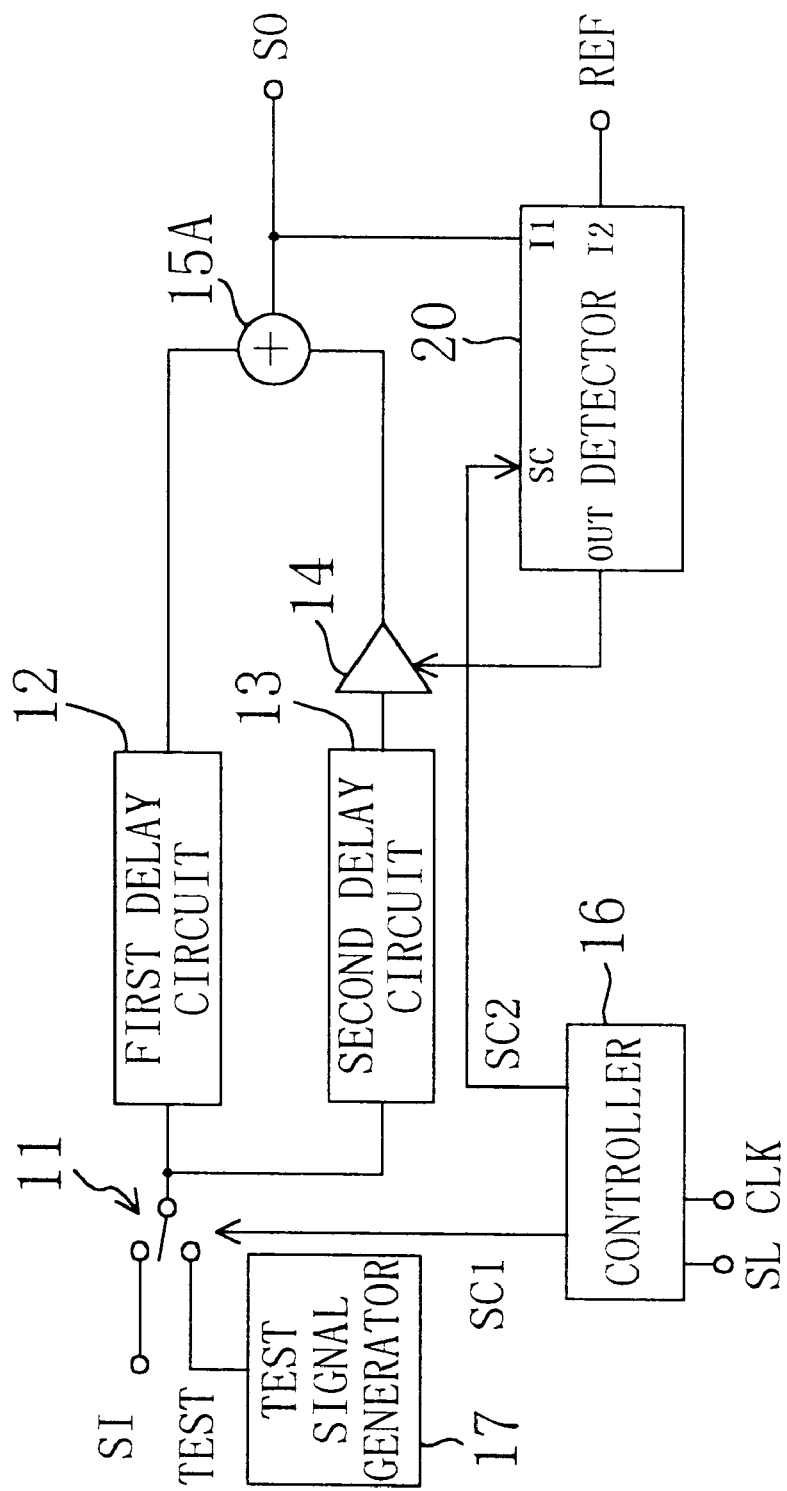
FIG. 5 is a diagram illustrating a modified embodiment of the comb filter according to the first embodiment of the present invention.
Figure 6:
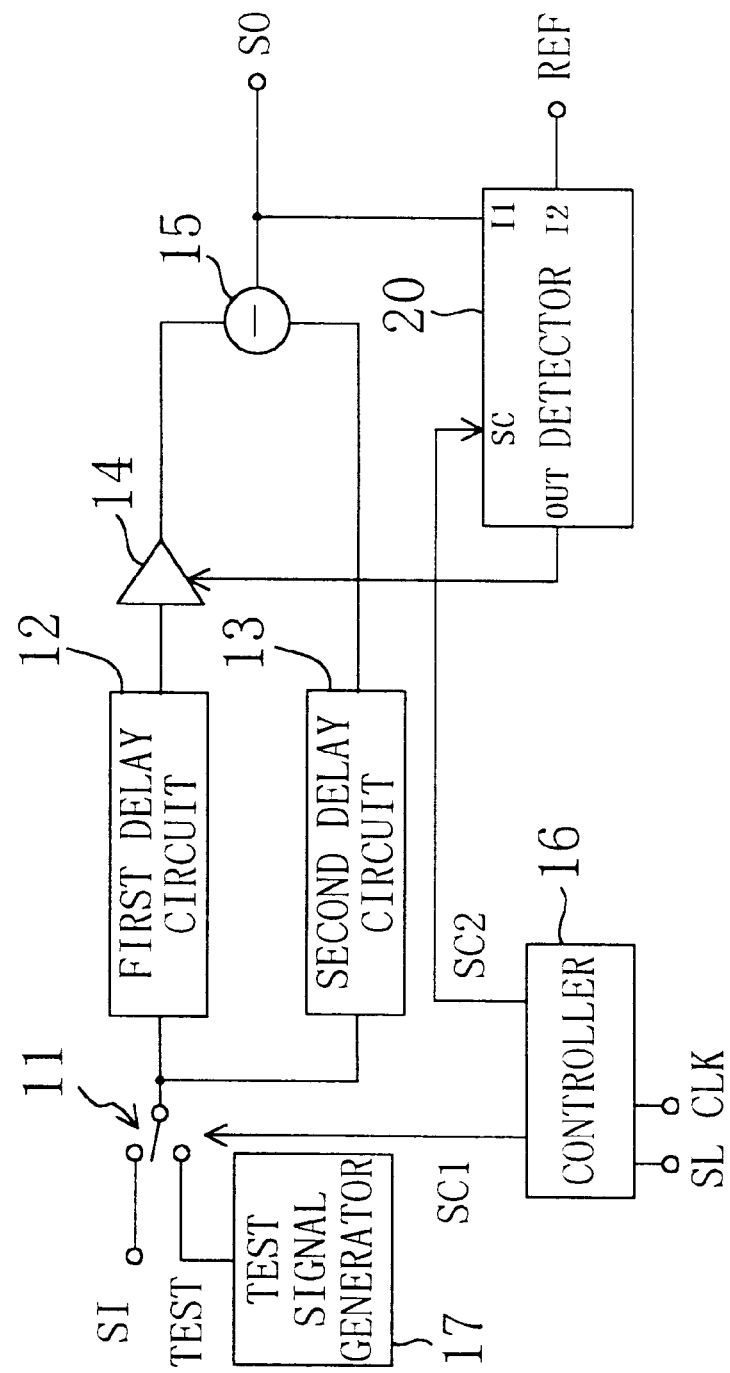
FIG. 6 is a diagram illustrating another modified embodiment of the comb filter according to the first embodiment of the present invention.
Figure 7:
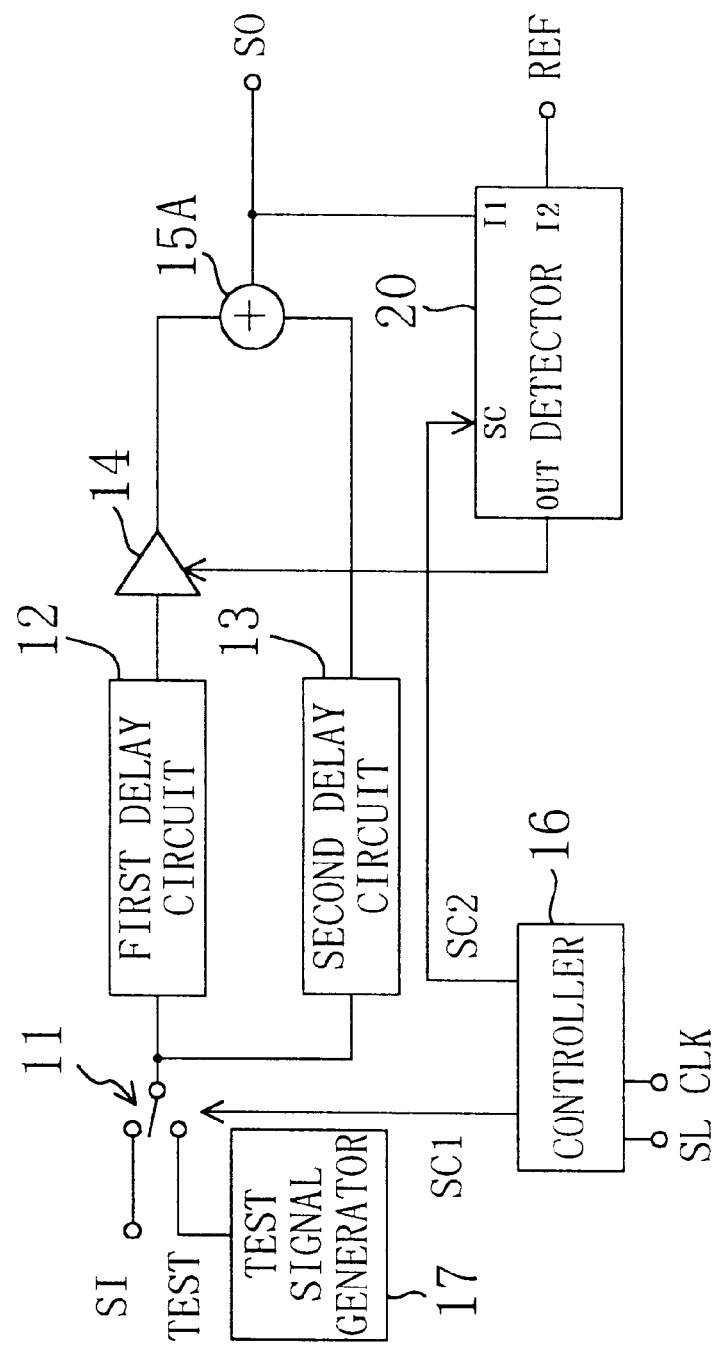
FIG. 7 is a diagram illustrating still another modified embodiment of the comb filter according to the first embodiment of the present invention.

FIGS. 5 through 7 are diagrams illustrating modified embodiments of the comb filter according to the first embodiment. In FIGS. 5 to 7, the same components as those shown in FIG. 1 are identified by the same reference numerals.

In the comb filter shown in FIG. 5, an adder 15A is provided as an alternate operation circuit instead of the subtracter 15 shown in FIG. 1. In such a case, the comb filter shown in FIG. 5 functions as a filter for passing DC components. The frequency characteristic F of the comb filter is represented by the following Equation (2):

$$F=(1+Z^{-1}) \qquad (2)$$

In the comb filter shown in FIG. 6, the variable-gain amplifier 14 is provided for the output of the first delay circuit 12, not the output of the second delay circuit 13 as in FIG. 1. That is to say, the variable-gain amplifier 14 may be provided for the output of either the first or second delay circuit 12 or 13. Generally speaking, the amplifier 14 may be provided for the more convenient one for the selected circuit design.

For example, the amplifier 14 may be provided for the first or second delay circuit 12 or 13, the gain of which can be controlled at 1 or less. Suppose the gain of one of the delay circuits exceeds 1 because of the provision of the variable-gain amplifier for the output of the delay circuit. In such a case, if the variable-gain amplifier is provided instead for the output of the other delay circuit, then the resulting gain never fails to be 1 or less in order to control the gains in a similar manner. In other words, whenever one of the outputs of the first and second delay circuits exceeds 1, the gain of the other is 1 or less. In general, it is easier to configure a variable-gain amplifier 14 if the input thereof is to be attenuated. Thus, the amplifier 14 is preferably provided for the delay circuit having a gain of 1 or less.

In the comb filter shown in FIG. 7, the adder 15A is provided as an alternate operation circuit instead of the subtracter 15 shown in FIG. 1. And the variable-gain amplifier 14 is provided for the output of the first delay circuit 12, not the output of the second delay circuit 13 as in FIG. 1.

EMBODIMENT 2

Figure 8:
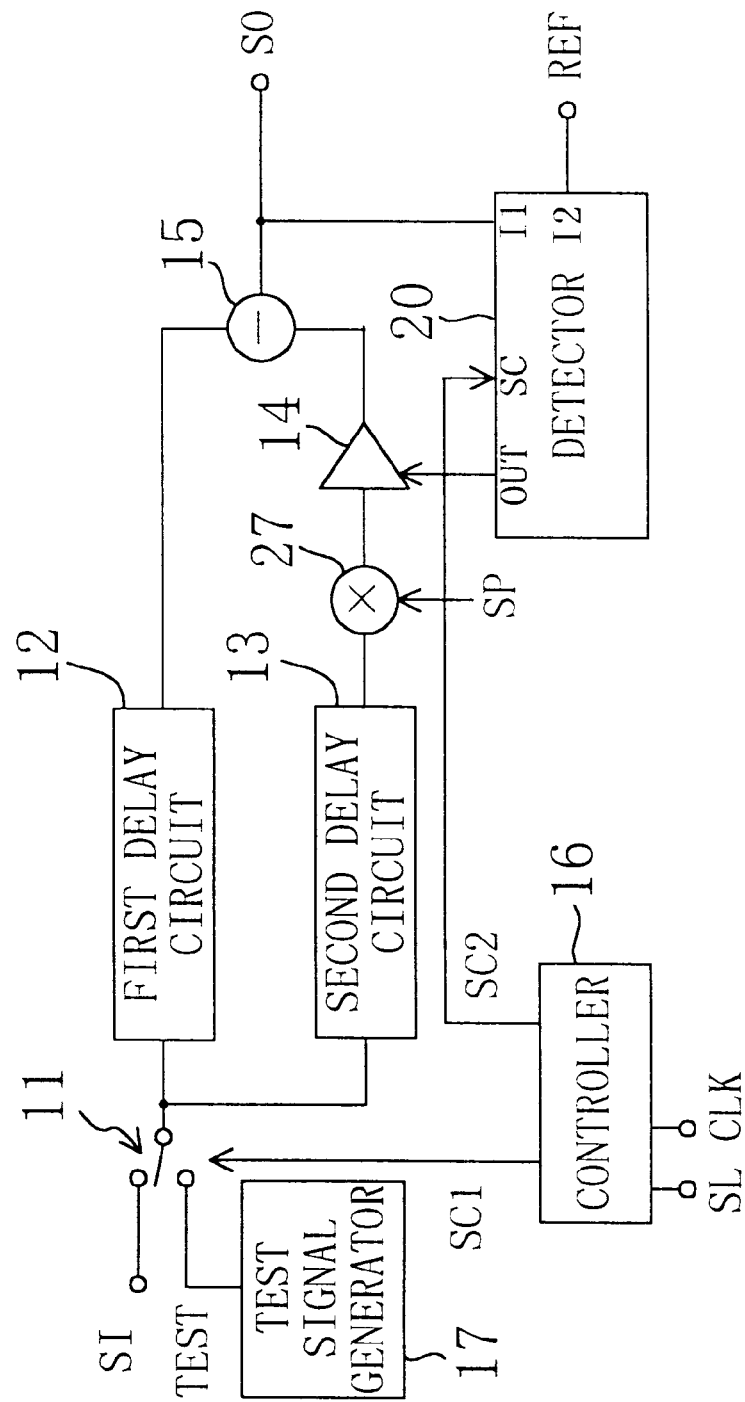
FIG. 8 is a diagram illustrating the configuration of a comb filter according to the second embodiment of the present invention.

FIG. 8 is a diagram illustrating the configuration of a comb filter according to the second embodiment of the present invention. In FIG. 8, the same components as those shown in FIG. 1 are identified by the same reference numerals.

In the comb filter shown in FIG. 8, a polarity inverter 27 is inserted between the output of the second delay circuit 13 and the variable-gain amplifier 14 provided therefor. In response to a polarity control signal SP, the polarity inverter 27 selectively inverts the polarity of the output signal of the second delay circuit 13. If the polarity inverter 27 does not invert the polarity, the comb filter shown in FIG. 8 is equivalent to the comb filter shown in FIG. 1. Alternatively, if the polarity inverter 27 does invert the polarity, the comb filter shown in FIG. 8 is equivalent to the comb filter shown in FIG. 5. That is to say, the comb filter shown in FIG. 8 can easily realize both the frequency characteristics represented by Equations (1) and (2).

In order to control the gains in accordance with two types of frequency characteristics, two types of reference signals REF are generally required. However, in this embodiment, since the polarity inverter 27 is provided, the gains can be controlled in accordance with these two types of frequency characteristics by using only one type of reference signal REF.

Specifically, in order to realize the frequency characteristic represented by Equation (1), the polarity inverter 27 is controlled not to invert the polarity. And in order to control the gains, a DC signal having a predetermined amplitude is supplied as a test signal TEST and an analog ground level is supplied as a reference signal REF as in the first embodiment.

On the other hand, in order to realize the frequency characteristic represented by Equation (2), the polarity inverter 27 is controlled to selectively invert the polarity depending on the operation mode, i.e., whether it is in a normal operation mode or a gain control mode. Such a selection is easily realizable by using the first control signal SC as the polarity control signal SP. Specifically, while the test signal TEST is being input to control the gains, the polarity inverter 27 is controlled not to invert the polarity. In such a state, the frequency characteristic of the comb filter is as represented by Equation (1), and the gains can be controlled by supplying an analog ground level as the reference signal REF. After the gains have been sufficiently stabilized, the polarity inverter 27 is controlled to invert the polarity in the normal operation mode. As a result, the frequency characteristic represented by Equation (2) is easily realized.

MODIFIED EMBODIMENT OF EMBODIMENT 2

Figure 9:
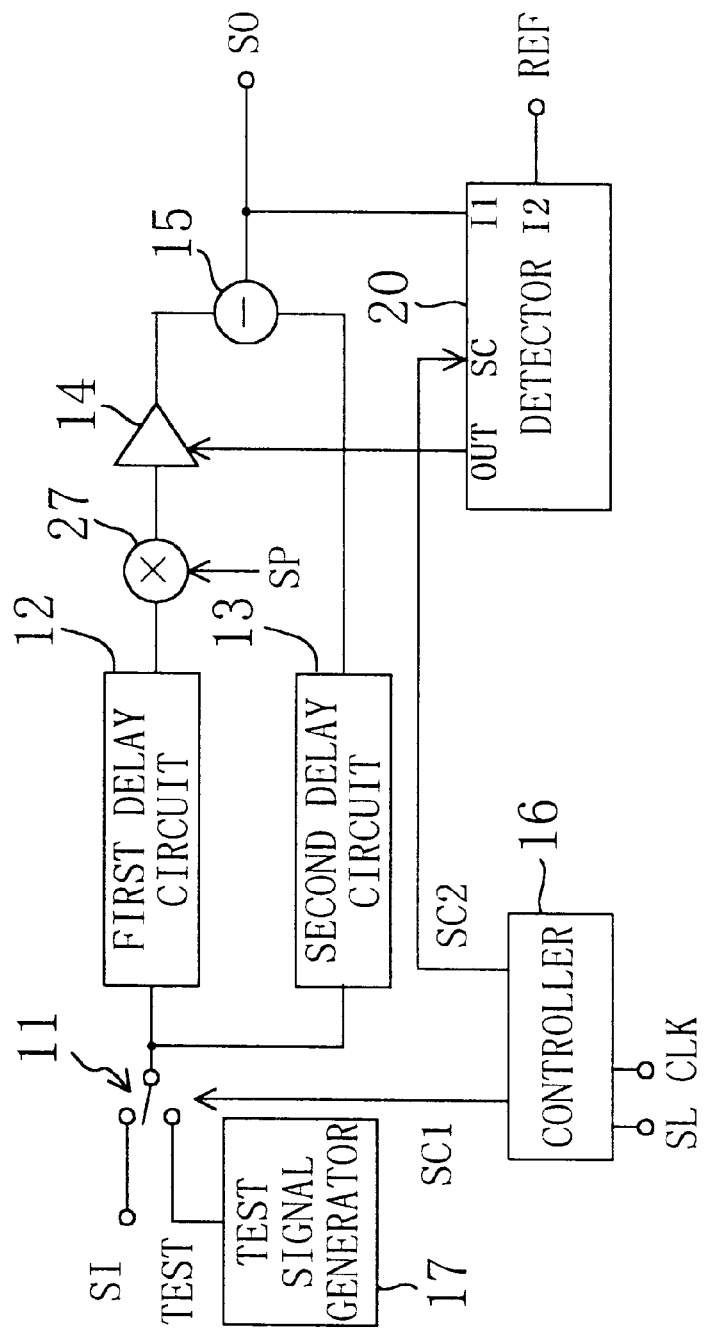
FIG. 9 is a diagram illustrating a modified embodiment of the comb filter according to the second embodiment of the present invention.

FIG. 9 is a diagram illustrating a modified embodiment of the comb filter according to the second embodiment. In FIG. 9, the same components as those shown in FIG. 8 are identified by the same reference numerals.

In the comb filter shown in FIG. 9, the variable-gain amplifier 14 and the polarity inverter 27 are provided for the output of the first delay circuit 12, not the output of the second delay circuit 13 as in FIG. 8.

EMBODIMENT 3

Figure 10:
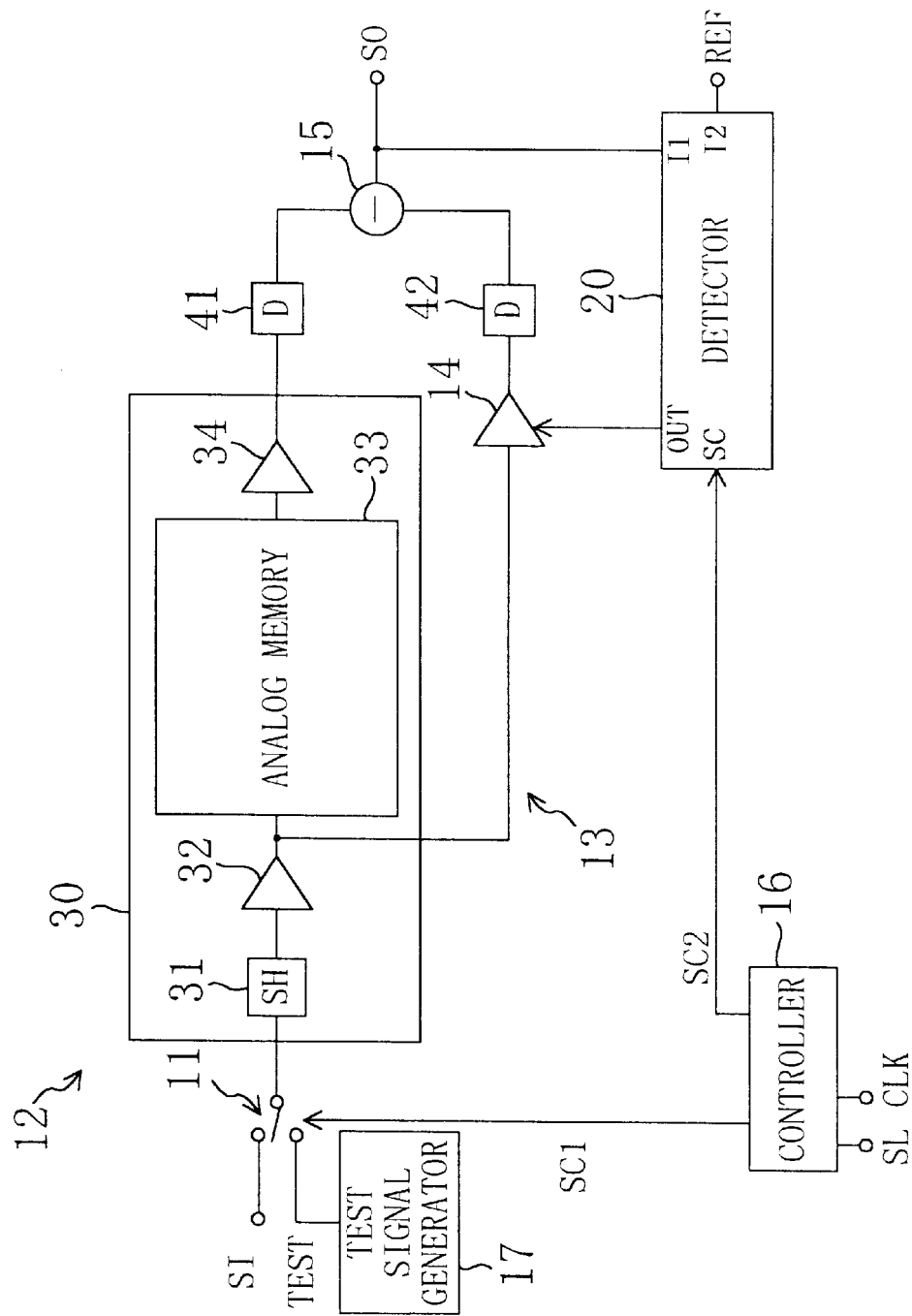
FIG. 10 is a diagram illustrating the configuration of a comb filter according to the third embodiment of the present invention.

FIG. 10 is a diagram illustrating the configuration of a comb filter according to the third embodiment of the present invention. In FIG. 10, the same components as those shown in FIG. 1 are identified by the same reference numerals. In the comb filter shown in FIG. 10, the first delay circuit 12 is implemented by an analog FIFO memory 30. The analog FIFO memory 30 includes: a sample and hold circuit 31; a write circuit 32; an analog memory 33; and a read circuit 34. The sample and hold circuit 31 samples and holds a signal input through the input select switch 11. The write circuit 32 amplifies the output of the sample and hold circuit 31. The analog memory 33 includes a plurality of storage devices for storing the output signal of the write circuit 32. And the read circuit 34 reads out a signal from the analog memory 33. The comb filter shown in FIG. 10 further includes first and second delay control circuits 41, 42 for controlling the delays of the outputs of the first and second delay circuits 12, 13.

An analog FIFO memory can be fabricated by the same process applied to the other circuit components of a comb filter, and therefore can be formed in the same LSI together with the other circuit components. Thus, as compared with constituting a delay circuit by a CCD as an external component in a conventional manner, the number of external components can be reduced. In addition, as described in the first and second embodiments, a large-capacitance capacitor can be eliminated by using the test signal TEST for controlling the gains. Thus, the comb filter shown in FIG. 10 can be implemented by a monolithic LSI.

In the comb filter shown in FIG. 10, the second delay circuit 13 (for simply slewing a signal) receives, as an input, the output of the write circuit 32 of the analog FIFO memory 30, not the selective output of the input select switch 11 as in FIG. 1. As a result, the stability of the comb filter can be further improved.

Figure 11A:
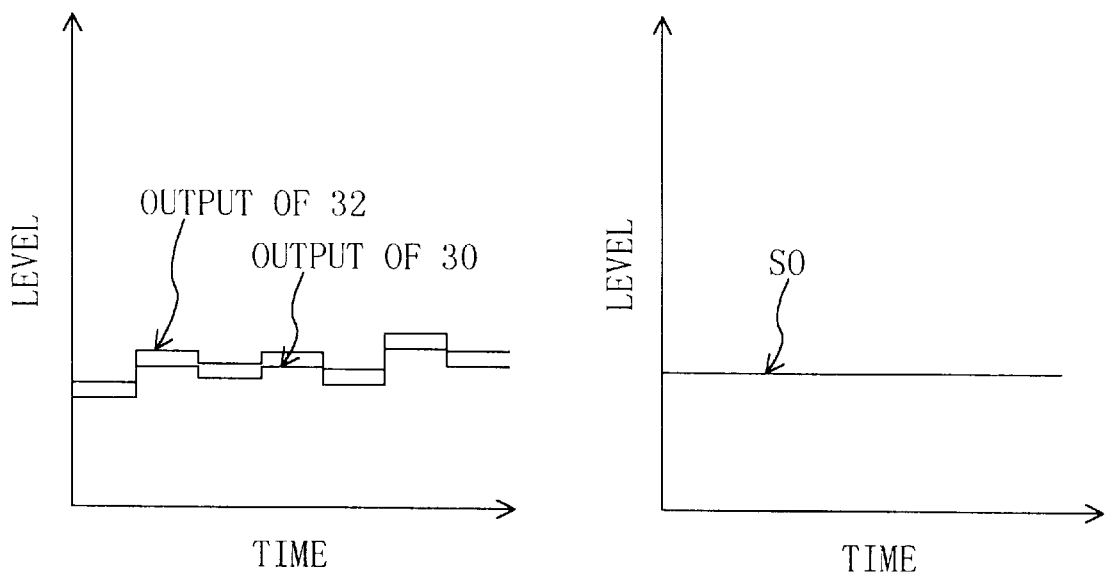
FIG. 11(a) is a graph schematically illustrating output signals where the present invention is applied.
Figure 11B:
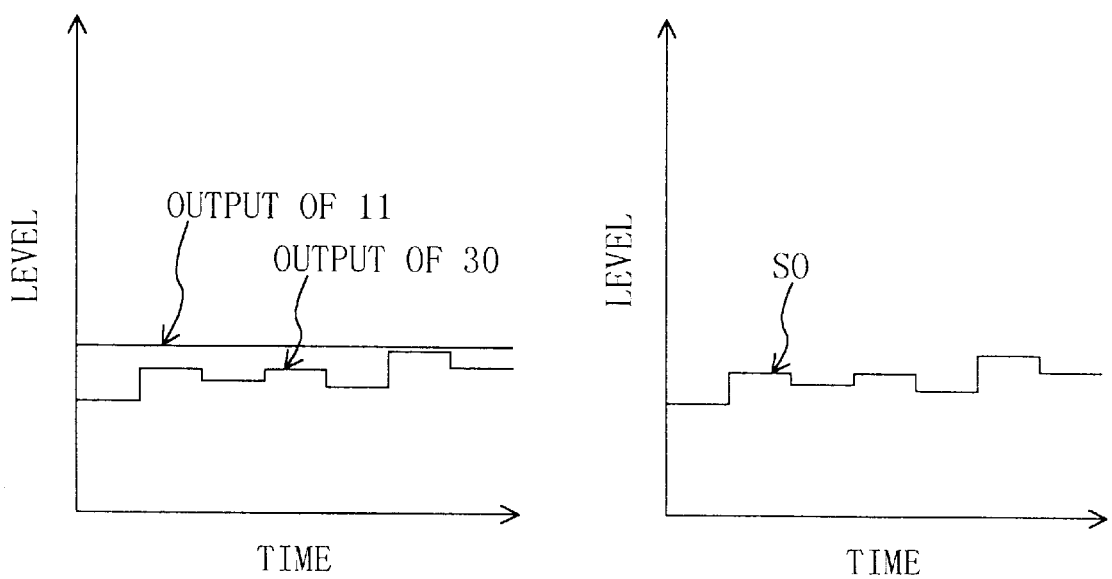
FIG. 11(b) is a graph illustrating output signals where the present invention is not applied.

FIG. 11(a) schematically illustrates output signals where the present invention is applied, while FIG. 11(b) illustrates output signals where the present invention is not applied. As shown in FIG. 11(a), the output signal of the analog FIFO memory 30 has a gain variable with the address in the analog memory 33, and the output signal of the write circuit 32 also has a variable gain. Thus, if the output of the write circuit 32 is input to the second delay circuit 13, then the gain variation is reflected in the output of the second delay circuit 13 and is canceled. As a result, the variation does not appear in the output signal SO. On the other hand, if the selective output of the input select switch 11 is input to the second delay circuit 13, then the variation in gain is not reflected in the output of the second delay circuit 13 at all as shown in FIG. 11(b). As a result, the gain variation appears as it is in the output signal SO. The present inventors already confirmed based on the experimental results using an LSI model that the output is effectively stabilized by employing this configuration.

This effect can be explained as follows in terms of frequency characteristics. In the following description, n denotes an address in the analog memory 33, and A(n) denotes a variation in gain that is generated when the write circuit 32 writes data into the analog memory 33.

If the selective output of the input select switch 11 is used as an input to the second delay circuit 13, the frequency characteristic F of the comb filter is represented by the following Equation (3):

$$F=(1-A(n)Z^{-1}) \qquad (3)$$

With such a frequency characteristic, the output is not stabilized.

On the other hand, if the output of the write circuit 32 is used as an input to the second delay circuit 13 as in this embodiment, the frequency characteristic F of the comb filter is represented by the following Equation (4):

$$F=(A(n)-A(n)Z^{-1})=A(n)(1-Z^{-1}) \qquad (4)$$

With such a frequency characteristic, the output is stabilized. In this case, the gain of the overall output signal is variable. However, it is the depth of a comb that counts in the characteristic of a comb filter. Accordingly, the variation in gain of an overall signal is generally negligible.

Figure 12:
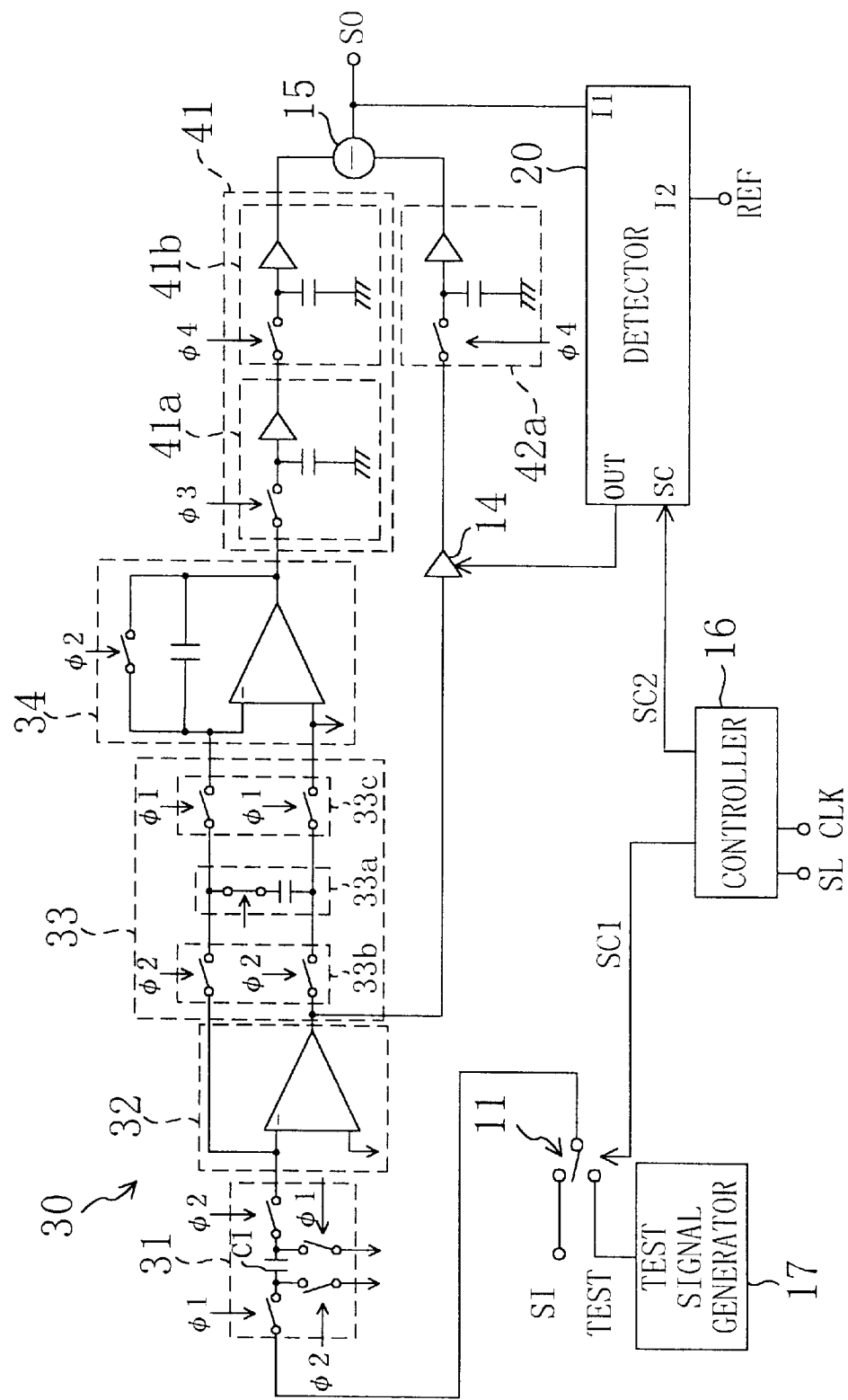
FIG. 12 is a diagram illustrating a detailed configuration of the comb filter shown in FIG. 10.

FIG. 12 is a diagram illustrating a detailed configuration of the comb filter shown in FIG. 10 including the internal configurations of the analog FIFO memory 30 and the first and second delay control circuits 41, 42. The analog memory 33 includes: a storage device 33a including a switch and a capacitor; an input bus selector 33b; and an output bus selector 33c. Though the analog memory 33 actually includes a plurality of storage devices 33a, only one storage device is illustrated in FIG. 12 for the sake of simplicity.

The first delay control circuit 41 consists of two serially connected sample and hold circuits 41a, 41b. On the other hand, the second delay control circuit 42 is implemented by a single sample and hold circuit 42a.

Figure 13:
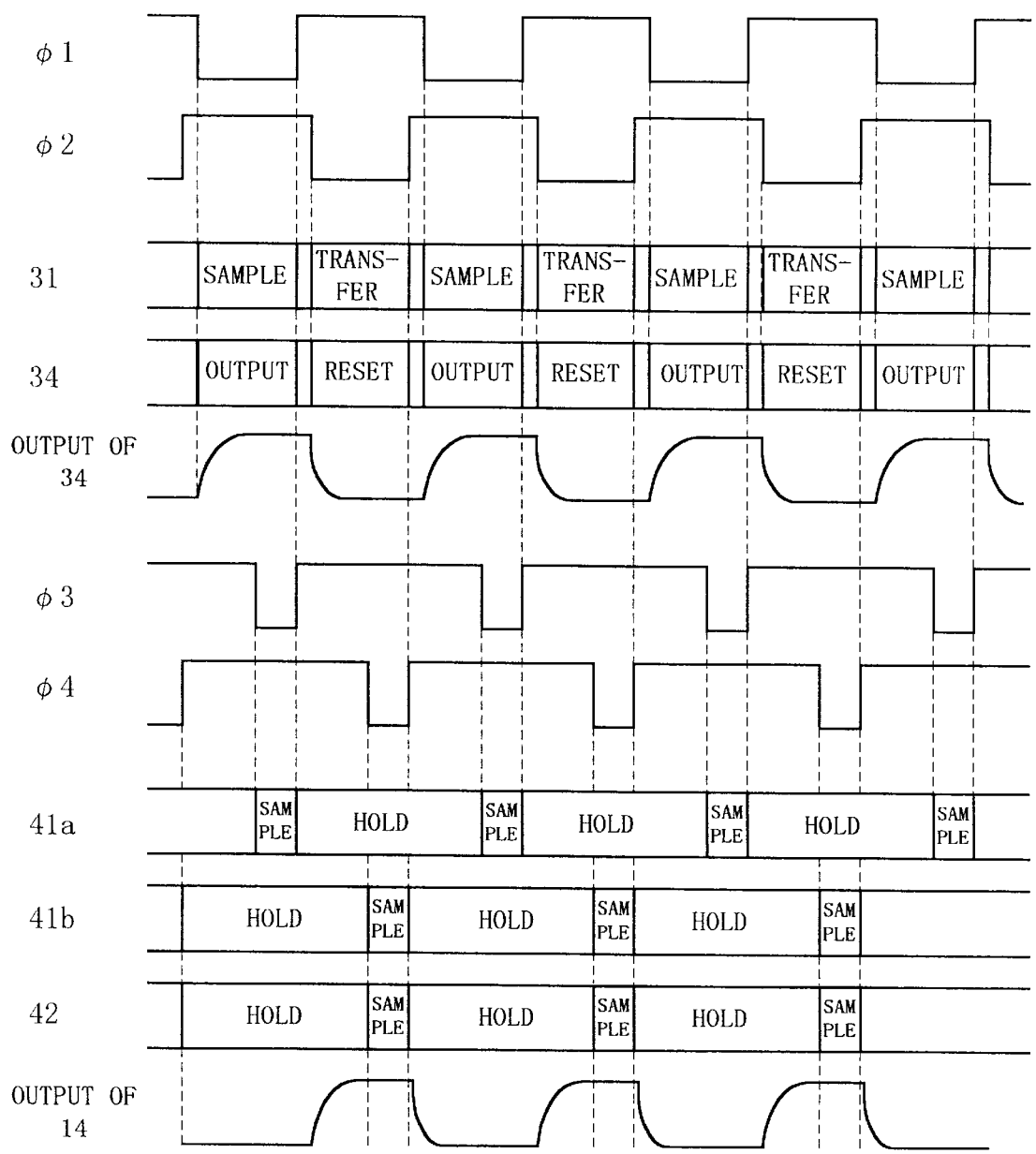
FIG. 13 is a timing diagram illustrating the operation of the comb filter shown in FIG. 12.
Figure 14:
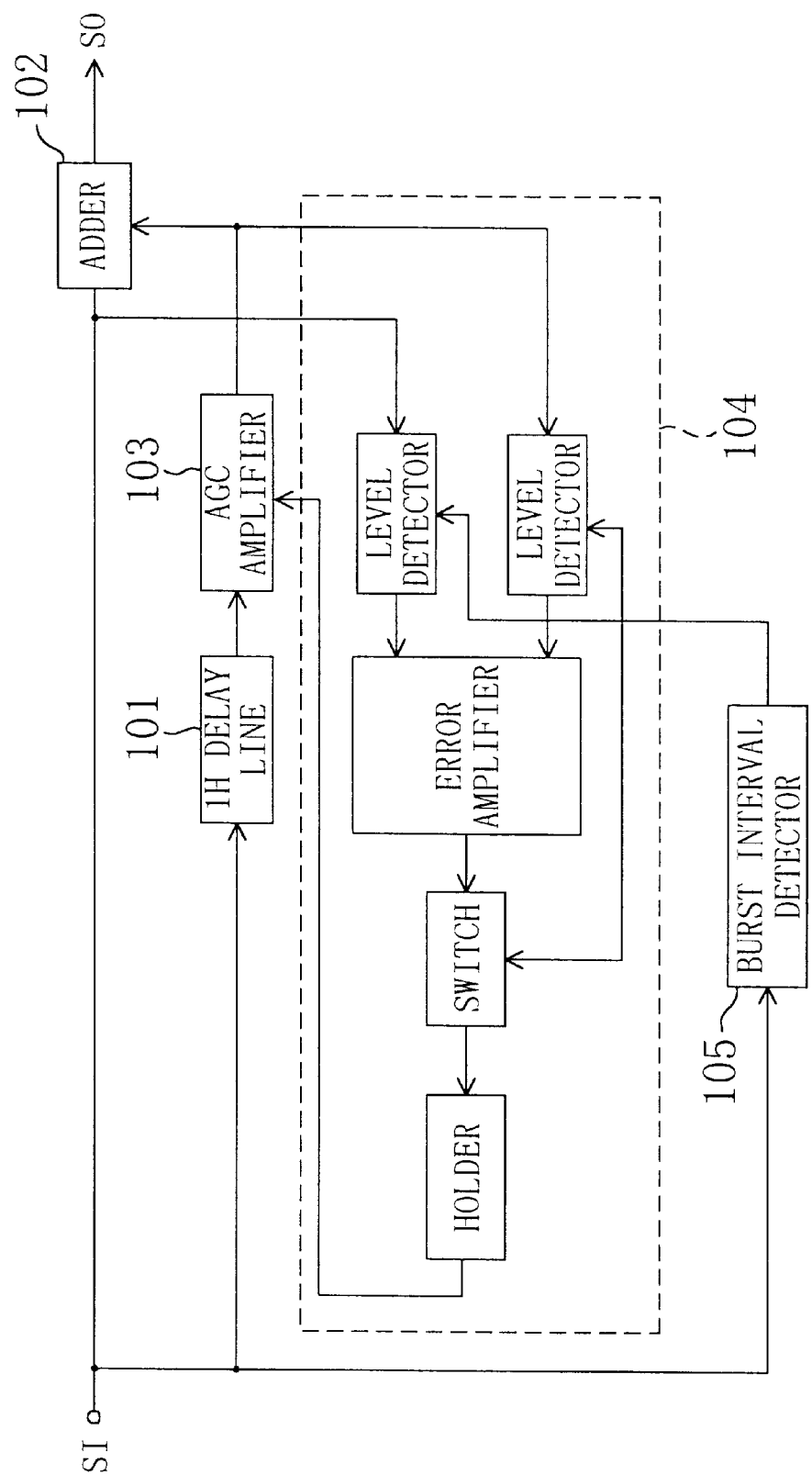
FIG. 14 is a diagram illustrating the configuration of a conventional comb filter.
Figure 15:
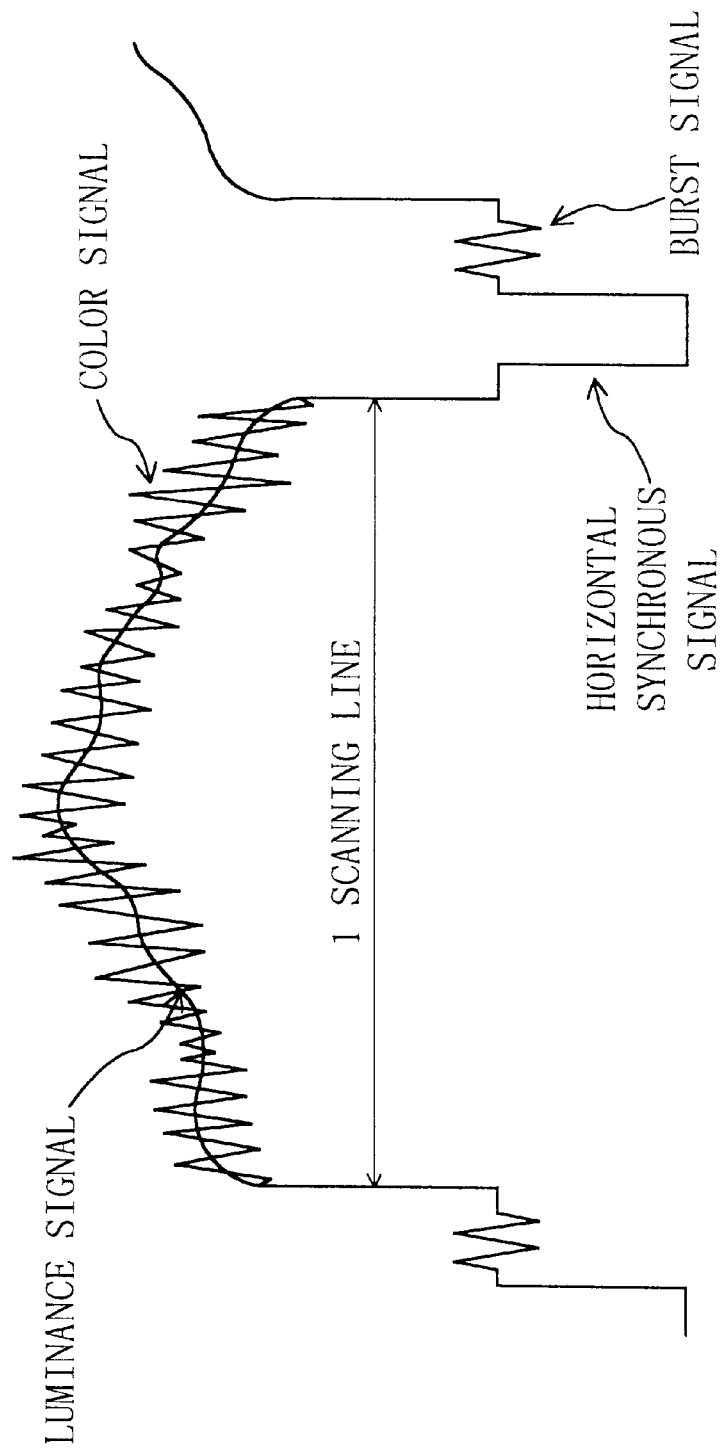
FIG. 15 is a diagram illustrating a burst signal.

FIG. 13 is a timing diagram illustrating the operation of the comb filter shown in FIG. 12.

The operations of inputting/outputting signals to/from the first delay circuit 12 are performed as follows. As shown in FIG. 13, the sample period of the sample and hold circuit 31 is in phase with the signal output period of the read circuit 34, because these circuits 31 and 34 operate in response to the same clock pulse. Thus, the phase of the output is delayed from that of the input for an amount of time corresponding to the product of the number of memory addresses and the number of clock pulses.

The input of the analog FIFO memory 30 is sampled and held by the sample and hold circuit 31. And the output signal of the read circuit 34 is sampled and held by the two sample and hold circuits 41a, 41b back to back. These two sample and hold operations can prevent the waveform of the transitional response during the settling operation, performed on the output signal of the read circuit 34, from appearing in the output signal SO. The final output signal of the first delay circuit 12 is output in synchronism with the time at which the sample and hold circuit 41b operates.

The operations of inputting/outputting signals to/from the second delay circuit 13 are performed as follows. The signal, sampled by the sample and hold circuit 31 in response to a clock pulse ø1, is transferred to the capacitor of the storage device 33a in the analog memory 33 in synchronism with a clock pulse ø2. Since the output of the write circuit 32 is input to the variable-gain amplifier 14, the output of the variable-gain amplifier 14 is also settled in synchronism with the clock pulse ø2. Thus, the output waveform thereof is as shown in FIG. 13. This signal is sampled and held by the sample and hold circuit 42a.

Finally, the output times of the first and second delay circuits 12, 13 are both determined by a clock pulse ø4, and are matched with each other. Thus, the difference in delay between the outputs of the first and second delay circuits 12, 13 at the input of the subtracter 15 is represented as: (the number of memory addresses in the analog FIFO memory 30)×(clock cycles). As a result, a comb filter with an accurate delay difference is realized.

What is claimed is:

1. A comb filter comprising:
   an input select switch for selectively outputting either an externally supplied image signal or a test signal independent of the image signal;
   first and second delay circuits for delaying the output of the input select switch for mutually different amounts of time;
   a variable-gain amplifier for amplifying the output of the first or second delay circuit, the gain of the variable-gain amplifier being variable;
   an operation circuit for deriving a sum or difference of the outputs of the variable-gain amplifier and the first or second delay circuit, for which the variable-gain amplifier is not provided;
   a detector for detecting a difference between the output of the operation circuit and a predetermined reference signal and for controlling the gain of the variable-gain amplifier in accordance with the difference; and
   control means for controlling the operations of the input select switch and the detector,
   wherein the control means makes the detector operate for a time interval during which the control means controls the input select switch to selectively output the test signal.

2. The comb filter of claim 1, wherein the image signal is a composite signal for TV,
   and wherein the control means controls the input select switch to selectively output the test signal during a blanking interval.

3. The comb filter of claim 1, wherein the test signal is a DC signal having a predetermined voltage.

4. The comb filter of claim 1, further comprising:
   a polarity inverter for selectively inverting a polarity of an output signal of the first or second delay circuit.

5. The comb filter of claim 1, wherein the detector comprises:
   an operational amplifier having a noninverting input receiving the predetermined reference signal and an output as the output of the detector;
   a resistor having one terminal thereof connected to the input of the detector;
   a first switch provided between the other terminal of the resistor and an inverting input of the operational amplifier;
   a capacitor provided between the inverting input and the output of the operational amplifier; and
   a second switch provided between the inverting input and the output of the operational amplifier in parallel to the capacitor.

6. The comb filter of claim 1, wherein at least one of the first and second delay circuits includes an analog FIFO memory.

7. A comb filter comprising:
   a first delay circuit including an analog FIFO memory and having a first predetermined delay time; and
   a second delay circuit having a second predetermined delay time different than said first predetermined delay time, wherein the analog FIFO memory includes:
- an analog memory having a plurality of storage devices
- a sample and hold circuit for sampling and holding an input of the analog FIFO memory;
- a write circuit for writing an output signal of the sample and hold circuit into the analog memory; and
- a read circuit for reading out the signal from the analog memory as an output of the analog FIFO memory, and wherein the second delay circuit receives the output of the write circuit as an input and a sum or difference of outputs of the first and second delay circuits by a subtracting means is output as an output of the comb filter.

8. The comb filter of claim 7, further comprising:
- a first delay controller having two serially connected sample and hold circuits and controlling a delay of the output of the first delay circuit; and
- a second delay controller having a single sample and hold circuit and controlling a delay of the output of the second delay circuit.

9. A method for controlling a comb filter, the comb filter comprising first and second delay circuits coupled to an input of a subtracting means for delaying respective input signals for mutually different amounts of time and for performing processing such as color separation on an image signal, the method comprising the steps of:
- inputting a test signal into the comb filter independent of the image signal;
- detecting a difference between said output of the subtracting means which has received the test signal and a predetermined reference signal; and
- controlling an amplitude of the output of at least one of the first and second delay circuits based on the difference.

10. The method of claim 9, wherein the image signal is a composite signal for TV, and wherein the test signal is input and the amplitude is controlled during a blanking interval.

11. The method of claim 9, wherein the test signal is a DC signal having a predetermined voltage.

* * * * *

UNITED STATES PATENT AND TRADEMARK OFFICE
CERTIFICATE OF CORRECTION

PATENT NO. : 6,121,826
DATED : September 19, 2000
INVENTOR(S) : Shiro Dosho et al.

It is certified that error appears in the above-identified patent and that said Letters Patent is hereby corrected as shown below:

<u>Title page,</u>
Item [56], References Cited, delete "62-06789 3/1987 Japan" and "620689 3/1987 Japan" and insert -- 62-67989 3/1987 Japans --

Signed and Sealed this

Fifth Day of February, 2002

Attest:

JAMES E. ROGAN
*Attesting Officer*    *Director of the United States Patent and Trademark Office*